United States Patent
Yamaguchi et al.

(10) Patent No.: US 7,755,793 B2
(45) Date of Patent: Jul. 13, 2010

(54) IMAGE FORMING SYSTEM AND COMPUTER READABLE MEDIUM STORING IMAGE FORMING PROGRAM FOR PROCESSING AND COMBINING BASIC COLORS

(75) Inventors: Yuya Yamaguchi, Saitama (JP); Nobuhide Kawabata, Saitama (JP); Mitsuhisa Yomogisawa, Saitama (JP); Shinichi Takahashi, Saitama (JP); Jun Wakamatsu, Saitama (JP); Ryouhei Iwasaki, Saitama (JP); Koichi Miyazaki, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 485 days.

(21) Appl. No.: 11/819,685

(22) Filed: Jun. 28, 2007

(65) Prior Publication Data
US 2008/0158577 A1 Jul. 3, 2008

(30) Foreign Application Priority Data
Dec. 28, 2006 (JP) .............................. 2006-354368

(51) Int. Cl.
*G06F 3/12* (2006.01)
*G06F 15/00* (2006.01)
(52) U.S. Cl. ....................................... 358/1.15; 358/1.9
(58) Field of Classification Search .................. 358/1.9, 358/2.1, 3.06, 3.13, 512, 515, 518; 382/162, 382/164, 165, 167
See application file for complete search history.

(56) References Cited

U.S. PATENT DOCUMENTS

| 5,971,523 | A | 10/1999 | Werner |
| 6,995,862 | B1* | 2/2006 | Murata et al. ................. 358/1.9 |
| 7,268,915 | B2* | 9/2007 | Fujino ......................... 358/1.9 |
| 2006/0092439 | A1 | 5/2006 | Hirabayashi |
| 2006/0221371 | A1 | 10/2006 | Ogasawara |
| 2006/0268316 | A1* | 11/2006 | Condon et al. ............. 358/1.15 |
| 2007/0115490 | A1* | 5/2007 | Yada ......................... 358/1.13 |

FOREIGN PATENT DOCUMENTS

| EP | 1 600 851 A2 | 11/2005 |
| JP | A 10-051636 | 2/1998 |
| JP | A 2001-162760 | 6/2001 |
| JP | B2 3488157 | 10/2003 |
| JP | A 2005-271550 | 10/2005 |
| JP | A-2006-159436 | 6/2006 |

* cited by examiner

*Primary Examiner*—Gabriel I Garcia
(74) *Attorney, Agent, or Firm*—Oliff & Berridge, PLC

(57) ABSTRACT

An image forming system includes: plural printing units each provided for each of different basic printing colors; and plural image processing units each provided in association with each of the printing units, and that generate image data for a basic color of the image processing unit's part and image data for other basic colors than the image processing unit's part required for combining processing of the image data for the basic color of the image processing unit's part, based on input printing data, and output resultant image data to a corresponding one of the printing units.

3 Claims, 11 Drawing Sheets

US 7,755,793 B2

IMAGE FORMING SYSTEM AND COMPUTER READABLE MEDIUM STORING IMAGE FORMING PROGRAM FOR PROCESSING AND COMBINING BASIC COLORS

CROSS-REFERENCE TO RELATED APPLICATIONS

This application is based on and claims priority under 35 USC 119 from Japanese Patent Application No. 2006-354368 filed Dec. 28, 2006.

BACKGROUND

1. Technical Field

The present invention relates to an image forming system and a computer readable medium storing an image forming program.

2. Related Art

Considering an attempt to realize a continuous-forms printer capable of high-speed, full-color printing on continuous forms, in which a single controller is used to perform image formation processing tasks for plural colors, there is a problem that the burden of the controller becomes so large as to make it difficult to fulfill performance requirements of the continuous-forms printer.

One approach that addresses this problem is disclosed. According to such related art, high-speed processing can be achieved, because each controller is only required to generate image data only for one color of its part. However, when the image formation processing tasks are separately performed for each basic color, if, for example, image combining such as raster operation (ROP) processing is required, basic color image data separate for each color is not sufficient for conversion into data required for image combining.

Here, the ROP processing is logical arithmetic processing that is performed when combining two or more raster images with one on top of the other. Not only simply overlaying one on top of the other, the ROP processing makes it possible to provide effects such as "watermarking" and "inversion".

SUMMARY

According to an aspect of the present invention, there is provided an image forming system including plural printing units each provided for each of different basic printing colors; and plural image processing units each provided in association with each of the printing units, and that generate image data for a basic color of the image processing unit's part and image data for other basic colors than the image processing unit's part required for combining processing of the image data for the basic color of the image processing unit's part, based on input printing data, and output resultant image data to a corresponding one of the printing units.

BRIEF DESCRIPTION OF THE DRAWINGS

Exemplary embodiments of the present invention will be described in detail based on the following figures, wherein.

DETAILED DESCRIPTION

Exemplary embodiments of the present invention are then described in detail with reference to the drawings.

First Exemplary Embodiment

Figure 1:
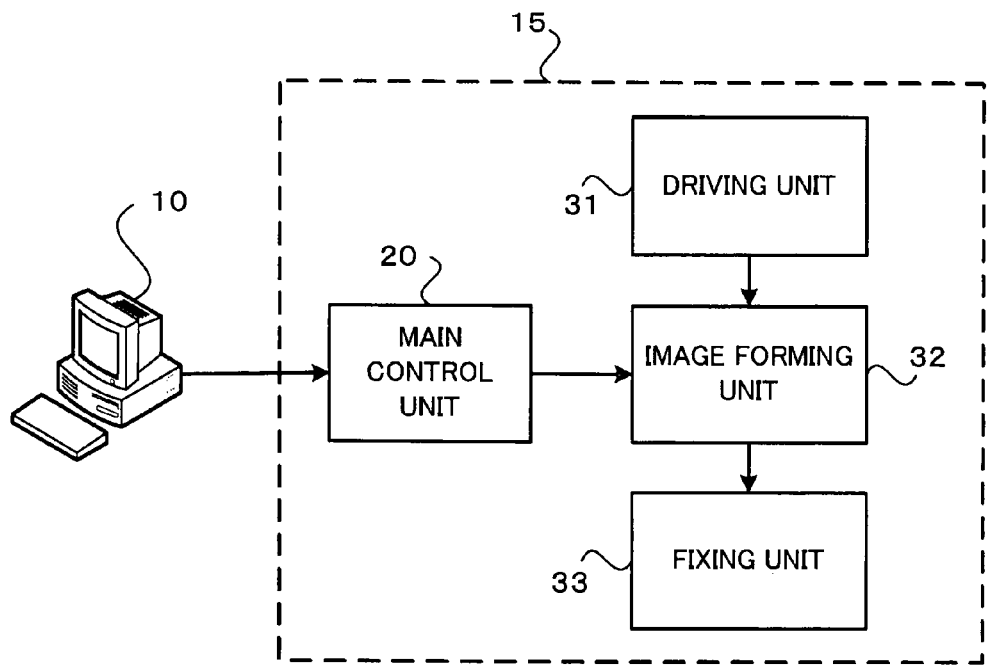
FIG. 1 is a block diagram showing a configuration of an image forming system according to a first exemplary embodiment of the invention.

FIG. 1 is a block diagram showing a structure of an image forming system according to a first exemplary embodiment of the invention.

The image forming system of the first exemplary embodiment, as shown in FIG. 1, is made up of a terminal device 10 and a printing device 15. Further, the printing device 15 is made up of a main control unit 20, a driving unit 31, an image forming unit 32, and a fixing unit 33.

The terminal device 10 generates and transmits printing data such as printing jobs to the printing device 15. The main control unit 20 of the printing device 15 receives printing data transmitted from the terminal device 10 and instructs the image forming unit 32 to output an image corresponding to the printing data. Here, the image forming unit 32 is a color, continuous-paper printer capable of color printing on continuous sheets.

Figure 2:
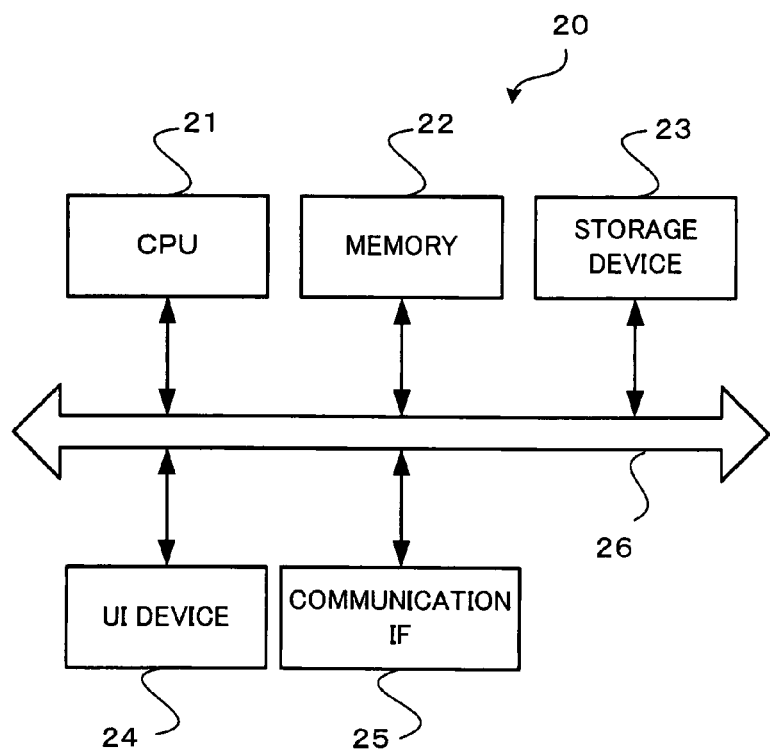
FIG. 2 is a diagram showing a hardware structure of a main control unit 20 in the image forming system according to the first exemplary embodiment of the invention.

Next, a hardware structure of the main control unit 20 in the first exemplary embodiment is presented in FIG. 2.

The main control unit 20, as shown in FIG. 2, includes a CPU 21, a memory 22, a storage device 23 such as a hard disk drive (HDD), a user interface (UI) device 24 including a touch panel or a liquid crystal display and a keyboard, and a communication interface (IF) 25 for transmitting and receiving data to/from the terminal device 10 and an image output unit 30. These components are interconnected via a control bus 26.

The CPU 21 executes predetermined processes according to a control processing program embodied in a computer readable medium and stored in the memory 22 or the storage device 23 and controls the operation of the main control unit 20.

The control processing program that is executed by the CPU 21 may be provided in a portable storage medium such as, for example, CD-ROM, DVD disk, magneto optical disk, and IC card or provided in a remote storage device such as an external HDD connected via a network. Thus, a program or the like according to a further exemplary embodiment of the invention which will be described later may, of course, be distributed via a communication medium or may be stored in a storage medium such as CD-ROM and distributed.

Figure 3:
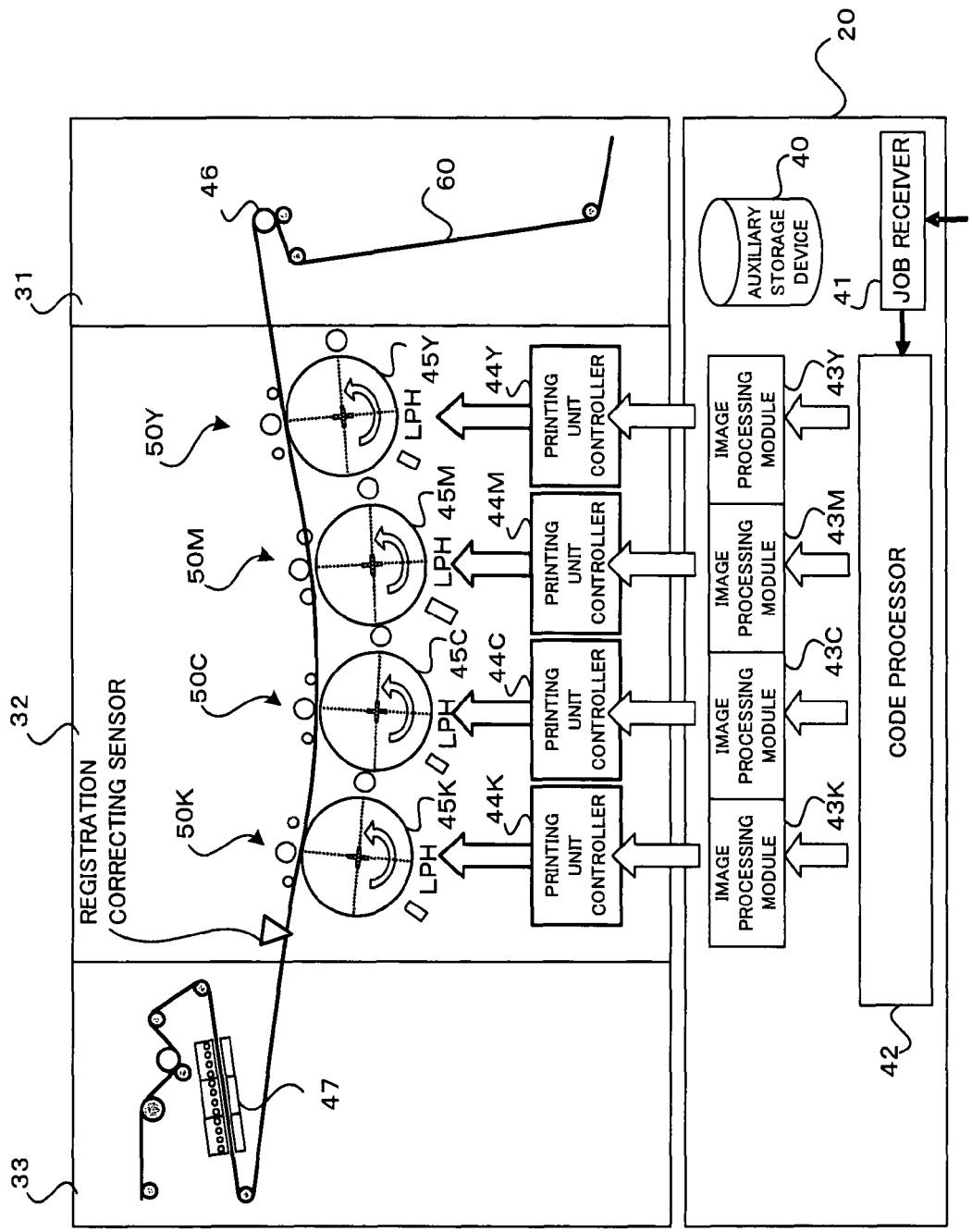
FIG. 3 is a block diagram showing an arrangement of functions of the main control unit 20 and configurations of a driving unit 31, an image forming unit 32, and a fixing unit 33 in the image forming system according to the first exemplary embodiment of the invention.

FIG. 3 is a block diagram showing an arrangement of functions of the main control unit 20, which are realized by the execution of the above control processing program, and configurations of the driving unit 31, image forming unit 32, and fixing unit 33.

In the present exemplary embodiment, the invention is explained by way of an example of color printing where four colors of cyan (C), magenta (M), yellow (Y), and black (K) are set as basic printing colors (process colors). However, the present invention is not intended to restrict the basic printing colors to the four colors. The present invention can by applied in the same way to other color printing modes using three colors, six colors, etc. as the basic printing colors.

The driving unit 31 includes a driving roller 46 for transporting paper 60. In the present exemplary embodiment, the invention is explained by way of an example where continuous sheets are used as the paper 60. However, the present invention is not intended to restrict its application to color printing on continuous sheets and can be applied in the same way to color printing on cut sheets.

The fixing unit 33 includes a fixing device 47 to fuse and fixate a toner image formed on the paper 60 onto the paper 60 by heating and other action.

The image forming unit 32 includes four printing units 50Y to 50K provided for each of the four basic printing colors (CMYK) and printing unit controllers 44Y to 44K each provided in association with each of the printing units 50Y to 50K.

Each of the printing units 50K to 50Y is made up of a corresponding one of photoreceptor drums 45Y to 45K, a development device, and other members. Each printing unit forms an image in a basic color of its part and transfers the image onto the paper 60.

Specifically, an electrostatic latent image is formed on each of the photoreceptor drums 45Y to 45K by laser light illumination from an LPH (LED Print Head). The electrostatic latent image formed on each of the photoreceptor drums 45Y to 45K is developed by applying a toner of each color thereto by a development device and transferred to the paper 60. The toner image transferred to the paper 60 is fused to the paper 60 by the fixing device 47 in the fixing unit 33.

The printing unit controllers 44Y to 44K control the printing operations of the printing units 50Y to 50K; that is, each controller controls its corresponding printing unit, based on image data for a basic color of its part which is one of the basic printing colors assigned to it.

The main control unit 20 is made up of a job receiver 41, an auxiliary storage device 40, a code processor 42, and image processing modules 43Y to 43K each provided in association with each of the printing unit controllers 44Y to 44K for each of the CMYK colors.

The job receiver 41 receives a printing job from the terminal device 10. The auxiliary storage device 40 is an auxiliary memory for temporarily storing the printing job received by the job receiver 41.

The code processor 42 performs a variety of processing tasks on the printing job received by the job receiver 41 and distributes resulting RGB printing data to the four image processing modules 43Y to 43K.

Based on the RGB printing data from the code processor 42, the image processing modules 43Y to 43K perform processing including RGB-to-CMYK color conversion, calibration, user TRC processing, processing for restricting a total of quantities of toners, ROP processing, and screening. Then, each module supplies the image data for a basic color of its part to the corresponding one of the printing unit controllers 44Y to 44K.

In short, each of the image processing modules 43Y to 43K generates image data for a basic color of its part based on the printing data input from the code processor 42 and transfers the image data to the corresponding one of the printing unit controllers 44Y to 44K.

In the following, referring to FIG. 4, it is described how printing data is passed through processes to the printing units 50Y to 50K and image formation processing is performed.

RGB printing data generated as the result of processing by the code processor 42 is sent to the image processing modules 43Y to 43K each provided for each basic color of its part. Each of the image processing modules 43Y to 43K generates image data for the basic color of its part and transfers the image data to the corresponding one of the printing unit controllers 44Y to 44K.

Figure 5:
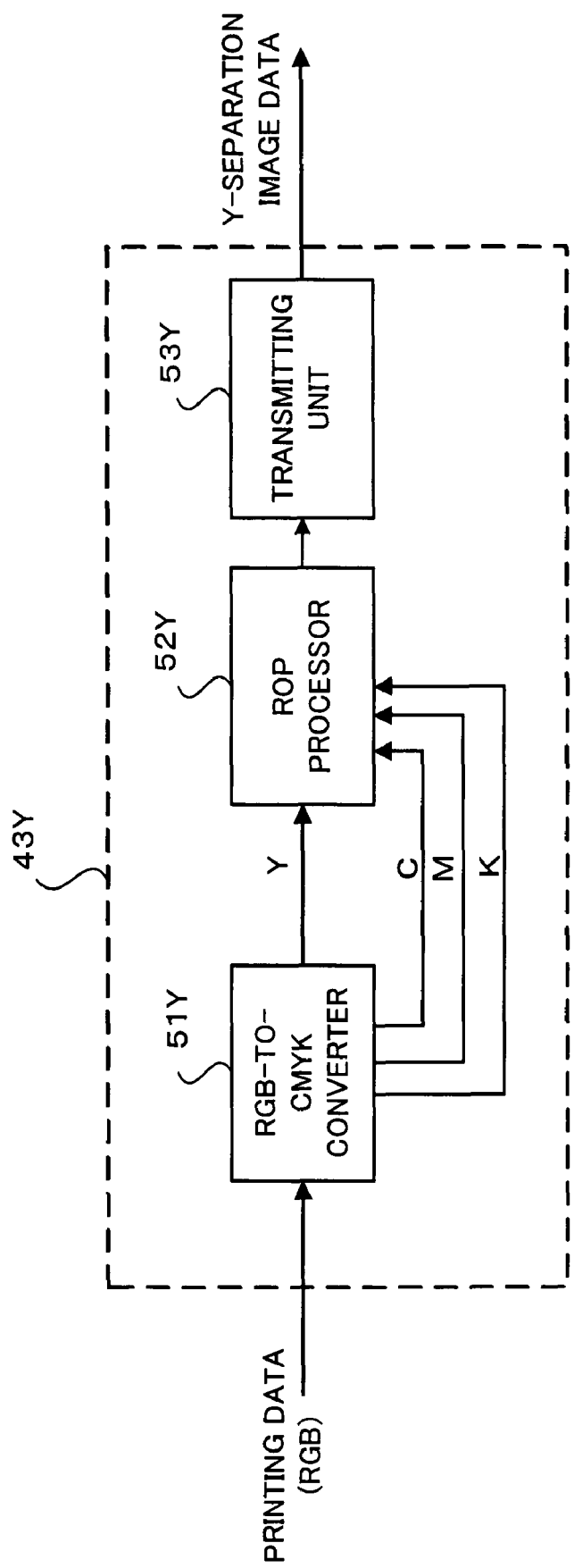
FIG. 5 is a block diagram showing a configuration of each of image processing modules 43Y to 43K in the image forming system according to the first exemplary embodiment of the invention.

Next, a configuration of each of the image processing modules 43Y to 43K is presented in a block diagram of FIG. 5. Since the four image processing modules 43Y to 43K have the same configuration except that each module handles a different basic color of its part, FIG. 5 presents only the configuration of an image processing module 43Y for a yellow (Y) basic color of its part.

The image processing module 43Y for a yellow basic color of its part, as shown in FIG. 5, includes an RGB-to-CMYK converter 51Y, an ROP processor 52Y, and a transmitting unit 53Y. Other operations including calibration, user TRC processing, processing for restricting a total of quantities of toners, and screening are performed in the image processing module 43Y; however, these operations are excluded from the description herein to simplify explanation.

The RGB-to-CMYK converter 51Y performs color conversion processing by using four direct look up tables (4DLUTs) and the like. Thereby, it converts the printing data (RGB) input from the code processor 42 into CMYK image data. Here, the RGB-to-CMYK converter 51Y in the present exemplary embodiment generates Y-separation image data which is image data for the basic color of its part based on the printing data (RGB) input from the code processor 42 and, moreover, generates image data for other colors (C, M, K) required for ROP processing on the Y-separation image data for the basic color of its part.

The ROP processor 52Y, if receiving a request for ROP processing (image combining processing), performs ROP processing on the Y-separation image data generated by the RGB-to-CMYK converter 51Y, using C, M, and K image data.

Printing data delivered from the code processor 42 includes information for indicating how to perform ROP processing and the image processing module 43Y performs the ROP processing according to this information.

The transmitting unit 53Y transfers the Y-separation image data after being performed of image combining processing by the ROP processor 52Y to the corresponding one 44Y of the four printing unit controllers 44Y to 44K.

Figure 6:
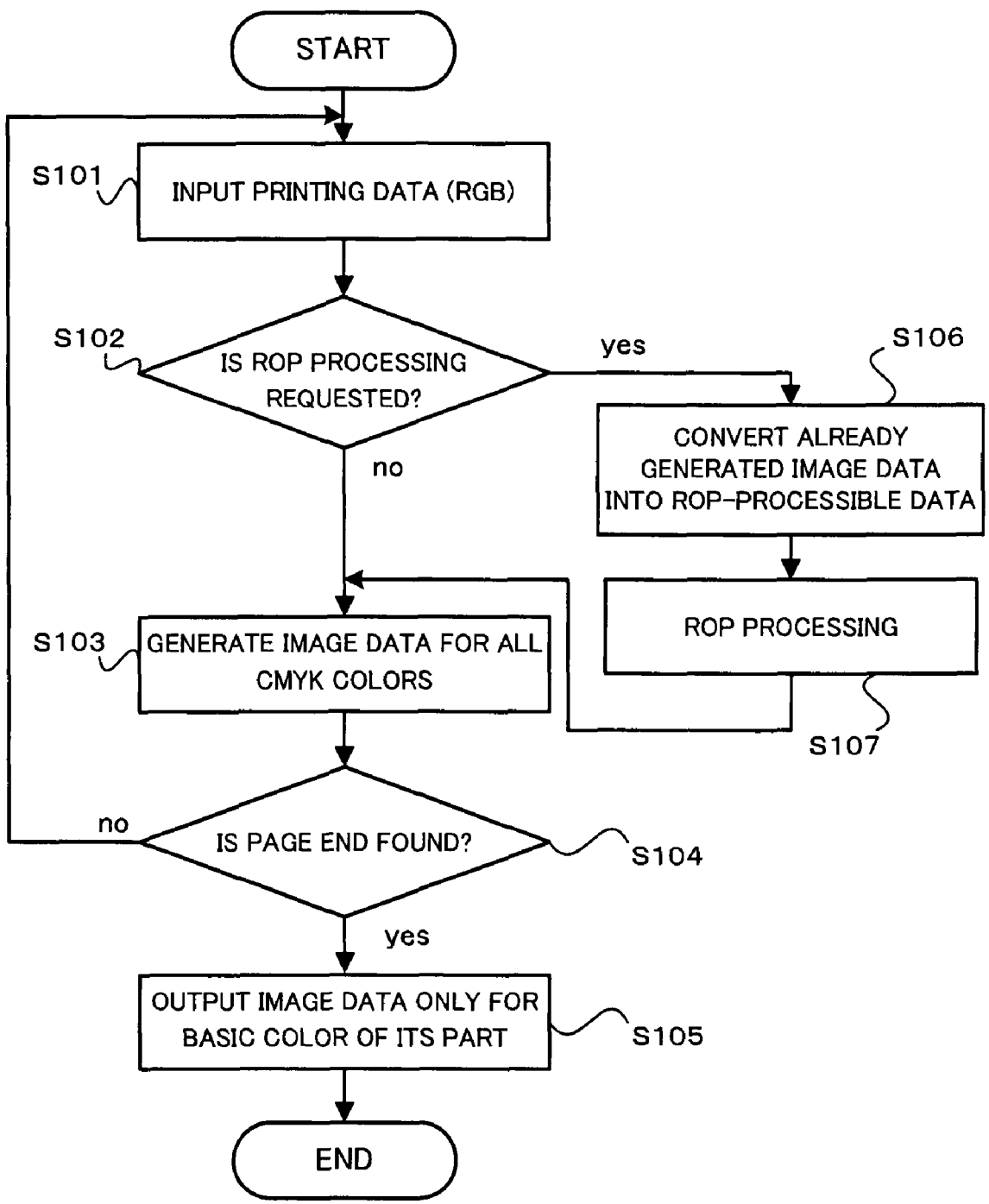
FIG. 6 is a flowchart illustrating the operation of each of the image processing modules 43Y to 43K in the image forming system according to the first exemplary embodiment of the invention.

Next, referring to a flowchart of FIG. 6, the operation of each of the image processing modules 43Y to 43K in the image forming system of the present exemplary embodiment is described in detail. Here, the operation of the image processing module 43Y is described.

When printing data (RGB) is input from the code processor 42 (step S101), the RGB-to-CMYK converter 51Y determines whether ROP processing is requested (step S102). If ROP processing is not requested, as determined at this step S102, the RGB-to-CMYK converter 51Y converts the input printing data (RGB) into CMYK, thus generating image data for all CMYK colors image data (step S103). If no page end is found (step S104), following printing data is input from the code processor 42 to the image processing module 43Y (step S101).

If ROP processing is requested, as determined at step S102, the ROP processor 52Y converts already generated image data into ROP-processable data (step S106) and performs ROP processing (step S107). Here, the ROP-processable data is image data having RGB data before being color converted by the RGB-to-CMYK converter 51Y.

In the image processing module 43Y in the present exemplary embodiment, the RGB-to-CMYK converter 51Y is adapted to generate not only Y-separation image data for the basic color of its part, but also C, M, and K image data required for ROP processing in the following stage.

Second Exemplary Embodiment

Next, an image forming system according to a second exemplary embodiment of the invention is discussed.

Figure 4:
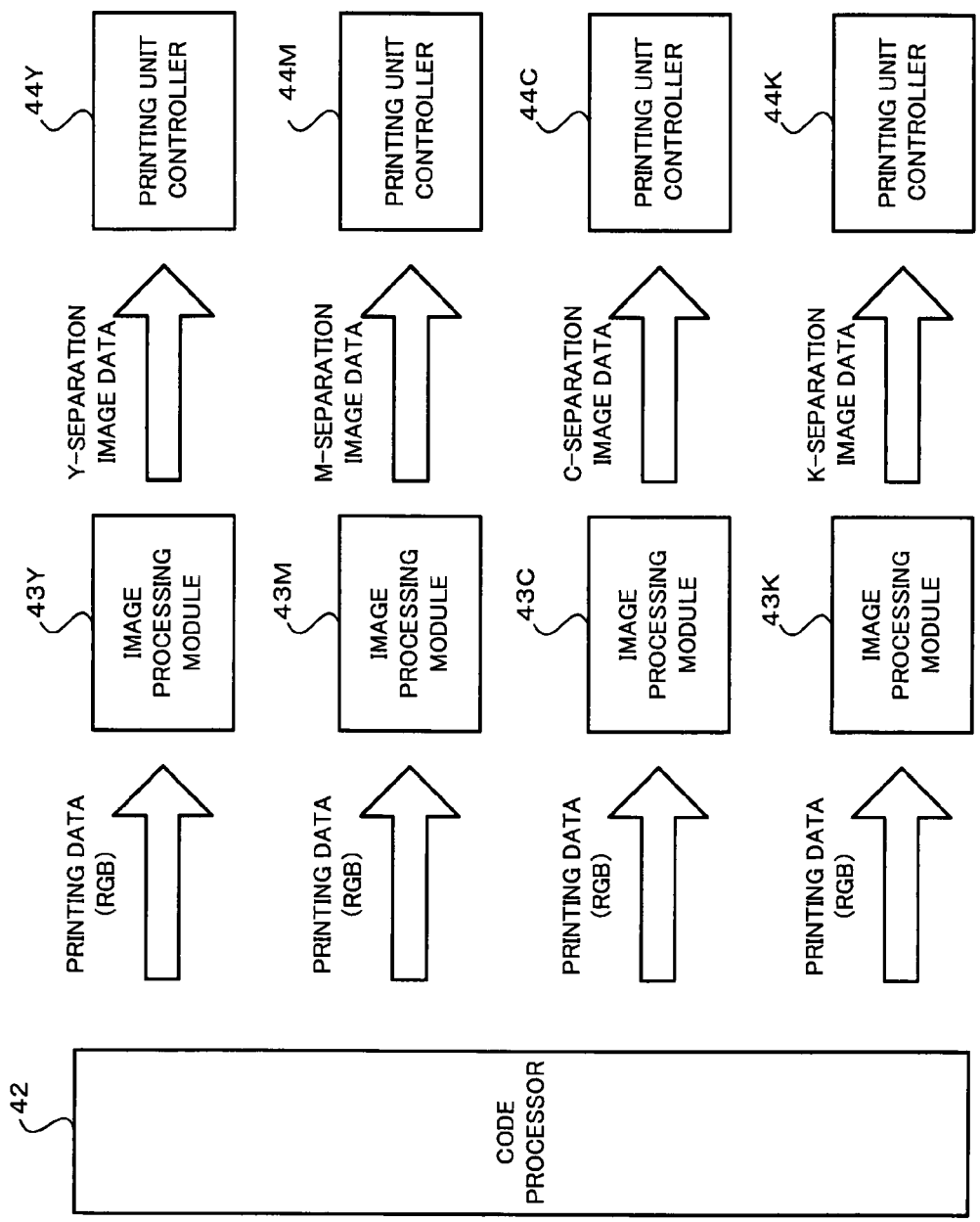
FIG. 4 illustrates how printing data is passed through processes to printing units 50Y to 50K and image formation processing is performed.
Figure 7:
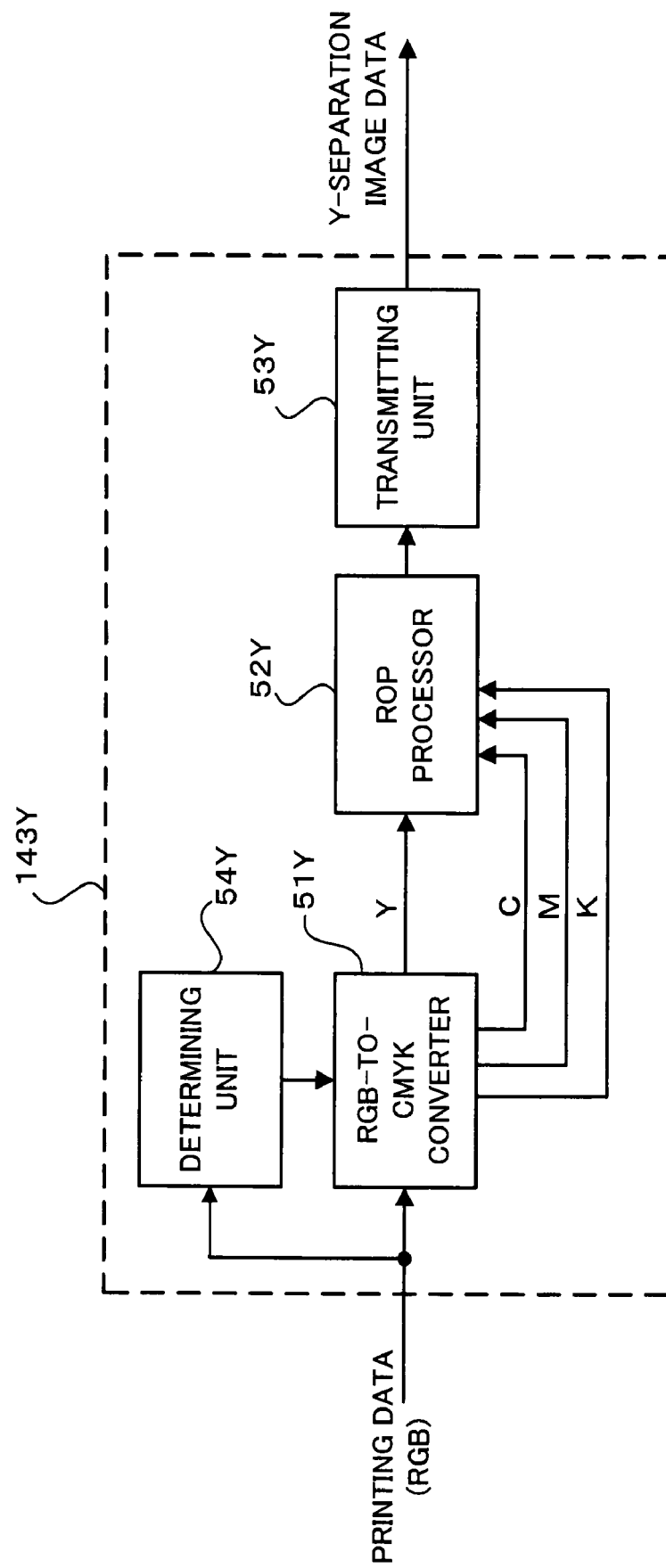
FIG. 7 is a block diagram showing a configuration of each of image processing modules 143Y to 143K in an image forming system according to a second exemplary embodiment of the invention.

The image forming system according to the second exemplary embodiment of the invention is configured such that the image processing modules 43Y to 43K in the image forming system according to the first exemplary embodiment, shown in FIGS. 3 and 4, are replaced by image processing modules 143Y to 143K configured as shown in FIG. 7. Although FIG. 7 presents only an image processing module 143Y which handles yellow as a color of its part, other image processing modules 143M to 143K which handle magenta, cyan, and black, respectively, as colors of their parts, have the same configuration. In FIG. 7, components corresponding to those shown in FIG. 5 are assigned the same reference identifiers and their description is not repeated.

The image processing module 143Y in the second exemplary embodiment is configured by adding a determining unit 54Y to the image processing module 43Y in the first exemplary embodiment shown in FIG. 5.

The determining unit 54Y determines whether image combining of Y image data for the basic color of its part with image data for other CMK colors is likely to be required, based on the printing data input from the code processor 42.

If the input printing data is, for example, text data, the determining unit 54Y determines that image combining of Y image data with CMK image data is not likely to be required.

The RGB-to-CMYK converter 51Y in the second exemplary embodiment generates CMK image data as well as Y image data, only if the determining unit 54Y determines that image combining of Y image data with CMK image data is likely to be required.

Figure 8:
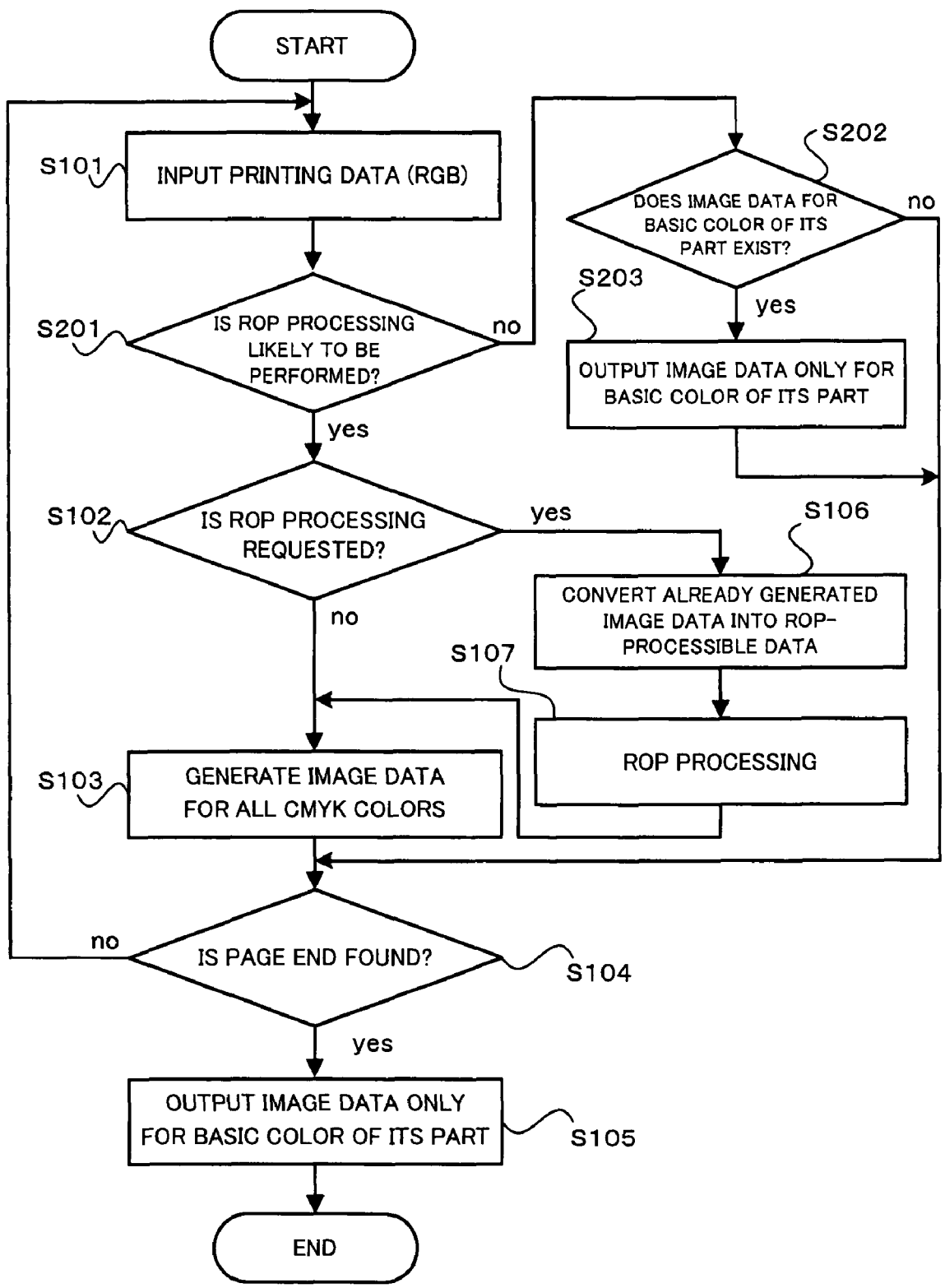
FIG. 8 is a flowchart illustrating the operation of each of the image processing modules 143Y to 143K in the image forming system according to the second exemplary embodiment of the invention.

Next, referring to a flowchart of FIG. 8, the operation of each of the image processing modules 143Y to 143K in the image forming system of the second exemplary embodiment is described in detail.

The flowchart shown in FIG. 8 is the one made by adding steps S201 to S203 to the corresponding flowchart shown in FIG. 6 for the first exemplary embodiment. Therefore, only the added steps S201 to S203 are explained here.

The determining unit 54Y determines whether ROP processing is likely to be requested (step S201), when printing data is input from the code processor 42 (step S101). If ROP processing is likely to be requested, as determined at step S201, the same steps as in the flowchart shown in FIG. 6 are performed and image data is generated for all CMYK colors.

If ROP processing is not likely to be requested, as determined at step S201, the RGB-to-CMYK converter 51Y determines whether image data for the basic color of its part exists (step S202). If it is determined that image data for the basic color of its part exists, the RGB-to-CMYK converter 51Y generates Y image data only for the basic color of its part (step S203).

In the image forming system of the second exemplary embodiment, the image processing modules 143Y to 143K are adapted such that each module generates image data for other colors as well as image data for the basic color of its part, only if ROP processing is likely to be required, instead of always doing so.

Third Exemplary Embodiment

Next, an image forming system according to a third exemplary embodiment of the invention is discussed.

Figure 9:
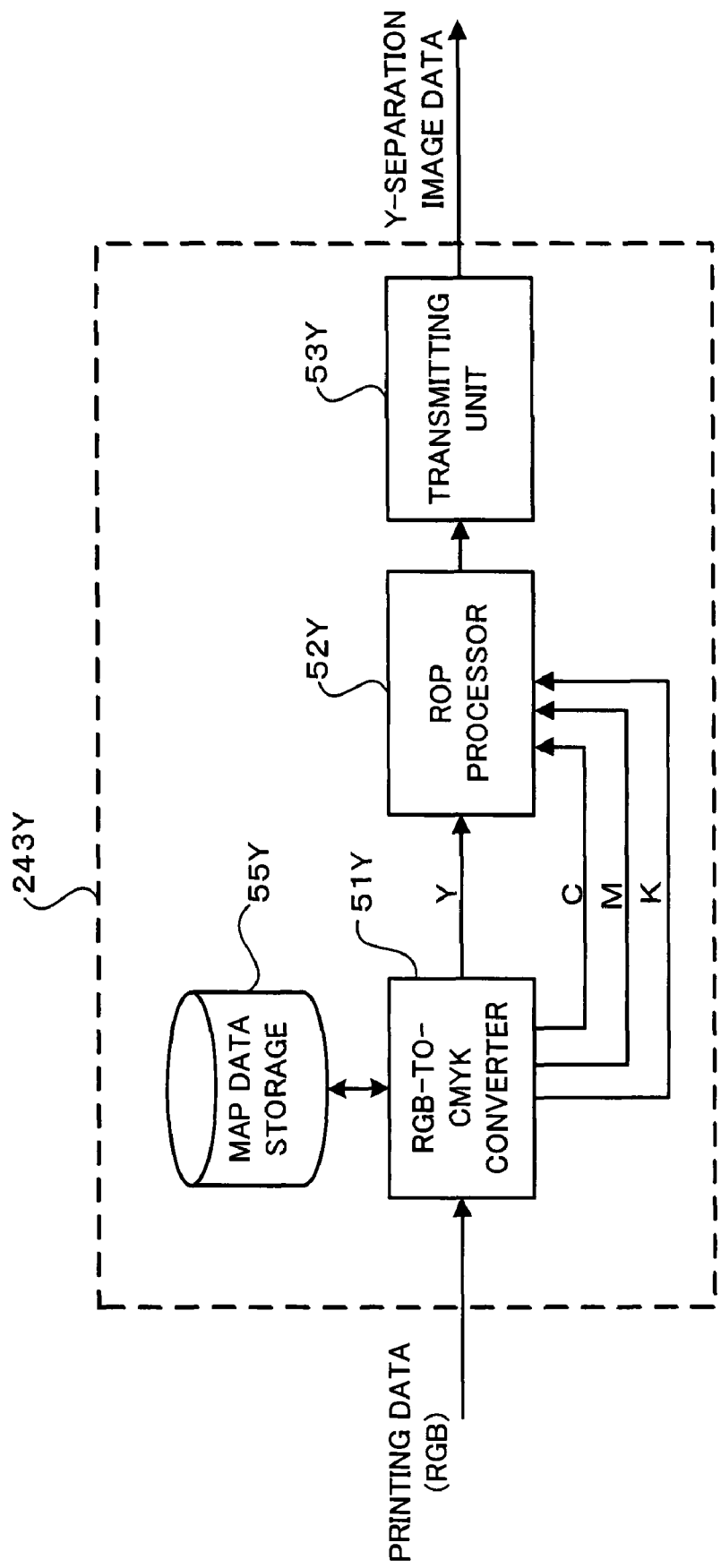
FIG. 9 is a block diagram showing a configuration of an image processing module 243Y in an image forming system according to a third exemplary embodiment of the invention.

The image forming system according to the third exemplary embodiment of the invention is configured such that the image processing modules 43Y to 43K in the image forming system according to the first exemplary embodiment, shown in FIGS. 3 and 4, are replaced by image processing modules 243Y to 243K configured as shown in FIG. 9. Although FIG. 9 presents only an image processing module 243Y which handles yellow as a color of its part, other image processing modules 243M to 243K which handle magenta, cyan, and black, respectively, as colors of their parts, have the same configuration. In FIG. 9, components corresponding to those shown in FIG. 5 are assigned the same reference identifiers and their description is not repeated.

The image processing module 243Y in the third exemplary embodiment is configured by adding a map data storage 55Y to the image processing module 43Y in the first exemplary embodiment shown in FIG. 5.

The map data storage 55Y stores map data indicating where image data for each of the four basic printing colors has been positioned within a page. The map data indicates where image data to be printed has been positioned within a page. Thus, a map position where image data for any color is generated within a page can be learned by referring to this map data.

The RGB-to-CMYK converter 51Y in the third exemplary embodiment refers to the map data stored in the map data storage 55Y and generates image data for C, M, K as well as image data for the basic color of its part, if Y image data for the basic color of its part overlaps image data for other colors on the map data.

Figure 10:
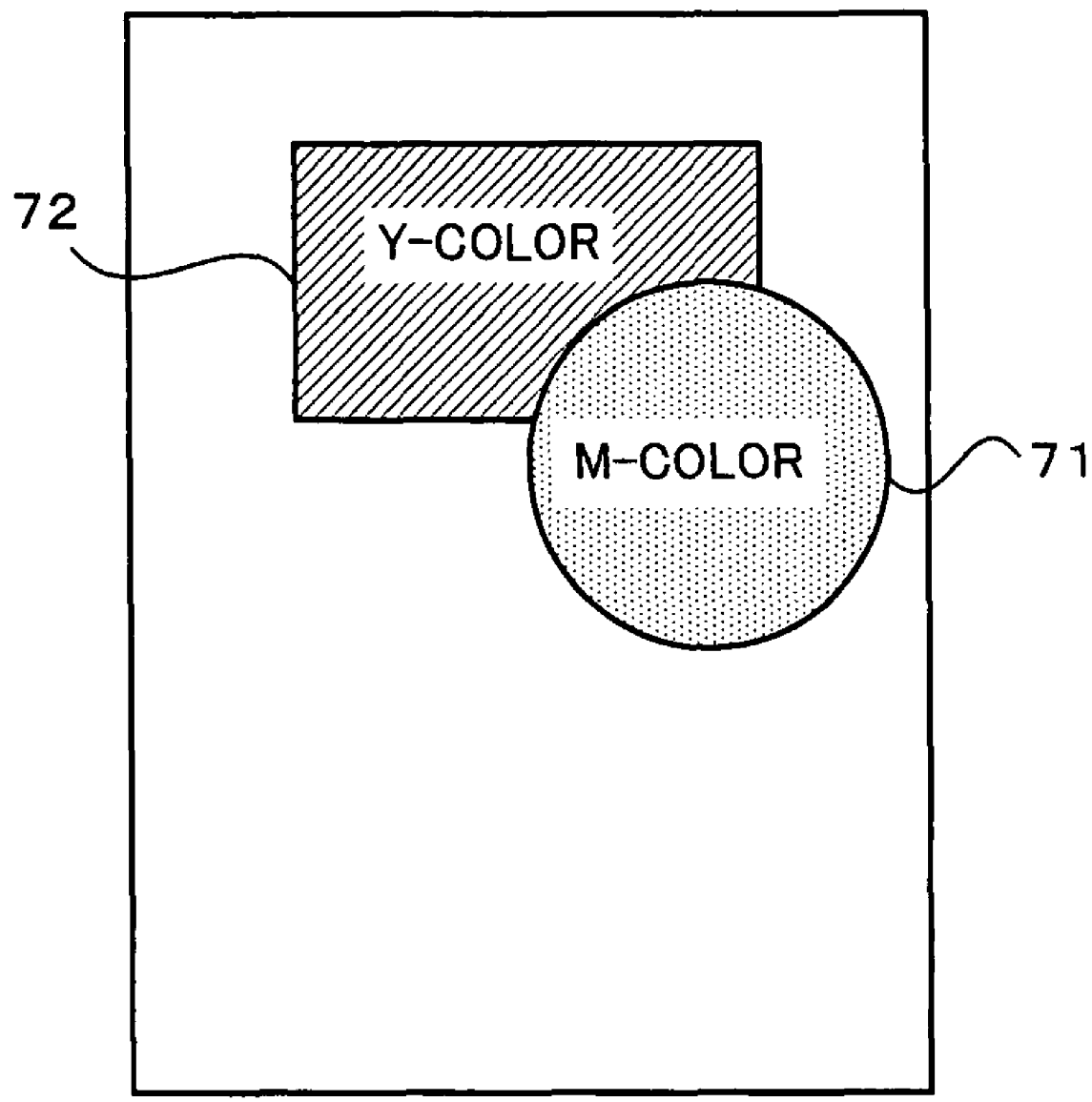
FIG. 10 illustrates an example of an image for the purpose of explaining map data.

This process is explained by way of an example where printing an image, for example, as illustrated in FIG. 10 is performed. The image shown in FIG. 10 is made up of a combination of a Y (yellow) color image 72 and an M (magenta) color image 71 with the latter image superimposed on a part of the area of the former.

Referring to FIG. 11, the processing operation that is performed by the image processing module 243 to produce this image as illustrated in FIG. 10 is described below.

Figure 11A:
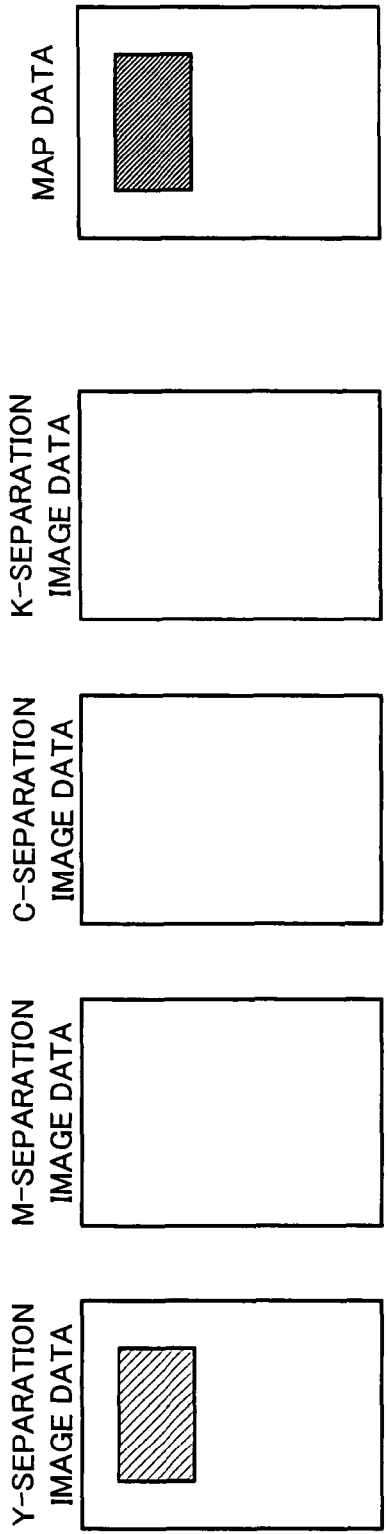
FIGS. 11A and 11B illustrate processing operation that is performed by an image processing module 243Y using map data.

First, the RGB-to-CMYK converter 51Y generates a Y-color image 72 by color conversion of input printing data and stores the result as Y-separation image data. At this time, the RGB-to-CMYK converter 51Y stores data representing a map position where the image data has been positioned in an area corresponding to the image 72 as map data stored in the map data storage 55Y (FIG. 11A).

Figure 11B:
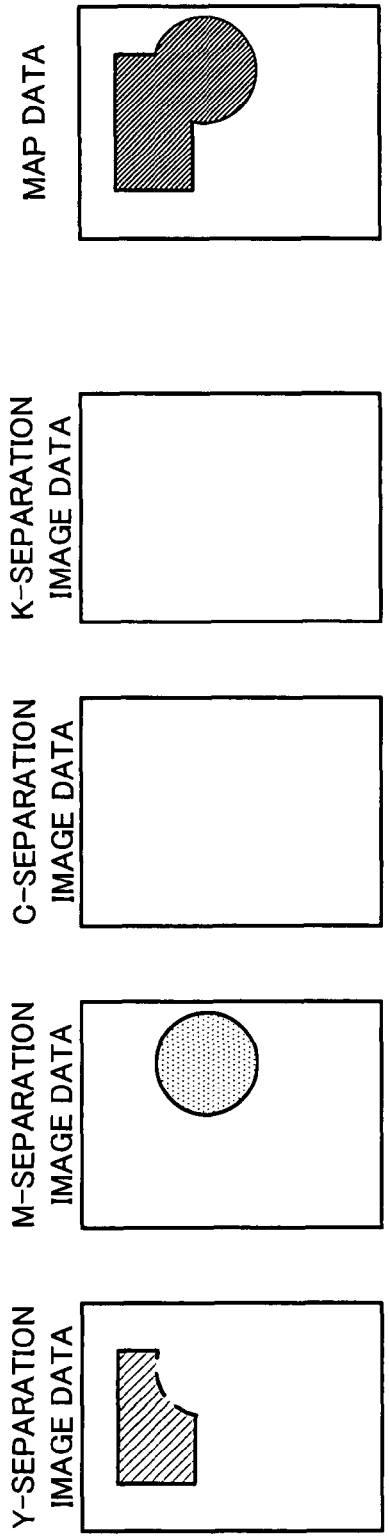

Then, the RGB-to-CMYK converter 51Y generates not only the Y image data for the basic color of its part, but also image data for other colors of M, C, and K, if following printing data to be processed overlaps the data previously positioned on the map data. Then, the overlapped portion of the Y-separation image data with the generated M-separation image data is deleted and replaced by white color data (FIG. 11B).

Although map data common for all basic colors is used, as illustrated by the presented example, individual map data separate for each color may be prepared.

Figure 12:
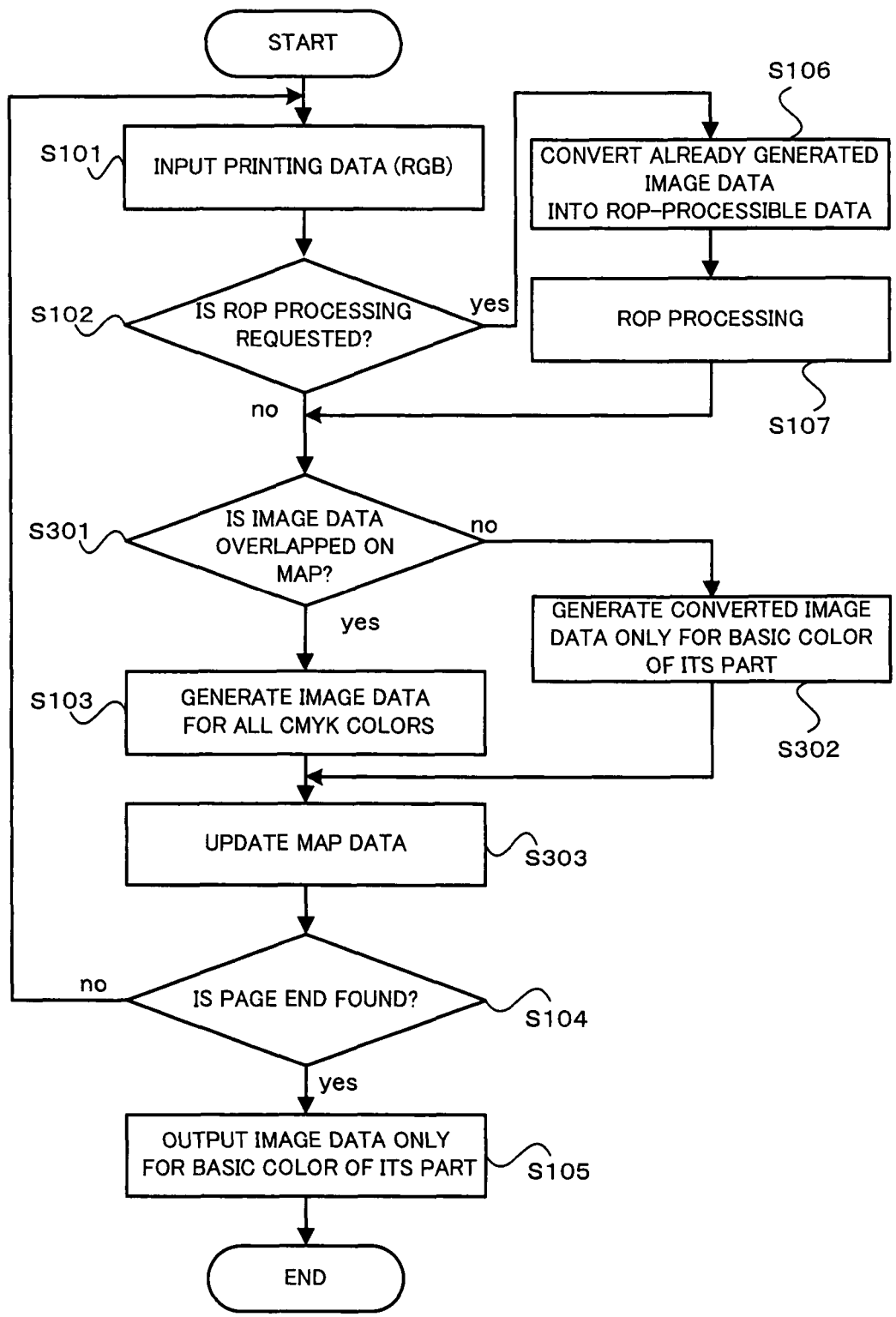
FIG. 12 is a flowchart illustrating the operation of each of image processing modules 243Y to 243K in the image forming system according to the third exemplary embodiment of the invention.

Next, referring to a flowchart of FIG. 12, the operation of each of the image processing modules 243Y to 243K in the image forming system of the third exemplary embodiment is described in detail.

The flowchart shown in FIG. 12 is the one made by adding steps S301 to S303 to the corresponding flowchart shown in FIG. 6 for the first exemplary embodiment. Therefore, only the added steps S301 to S303 are explained here.

When performing color conversion of input printing data, the RGB-to-CMYK converter 51Y refers to map data stored in the map data storage 55Y and determines whether Y image data overlaps previously generated image data for other colors on the map data (step S301). If the Y image data overlaps image data for other colors, as determined at step S301, the RGB-to-CMYK converter 51Y generates image data for all CMYK colors (step S103); if not, it generates converted image data only for the basic color of its part (step S302).

Then, the RGB-to-CMYK converter 51Y updates the map data and stores it into the map data storage 55Y (step S303).

In the image forming system according to the third exemplary embodiment, the image processing modules 243Y to 243K are adapted such that each module generates image data for other colors as well as image data for the basic color of its part, only if the image data for the basic color of its part overlaps image data for other colors on the map data.

The present invention may be embodied in other specific forms without departing from its spirit or characteristics. The described exemplary embodiments are to be considered in all respects only as illustrated and not restrictive. The scope of the invention is, therefore, indicated by the appended claims rather than by the foregoing description. All changes which come within the meaning and range of equivalency of the claims are to be embraced within their scope.

What is claimed is:

1. An image forming system comprising:
    a plurality of printing units each provided for one of different basic printing colors; and
    a plurality of image processing units each provided in association with one of the printing units,
    wherein each image processing unit includes:
        a generating unit that generates image data for a basic color of the image processing unit and image data for basic colors other than the basic color of the image processing unit required for combining processing of the image data for the basic color of the image processing unit, based on input printing data;
        an image combining processing unit that performs image combining processing of the image data for the basic color of the image processing unit generated by the generating unit; and
        a transmitting unit that transmits the image data for the basic color of the image processing unit combined with other color image data after being processed by the image combining unit to the corresponding one of the printing units.

2. The image forming system according to claim 1, wherein each image processing unit further comprises a determining unit that determines whether image combining of image data for the basic color of the image processing unit with the other color image data is likely to be required, based on the input printing data; and
    the generating unit generates image data for other colors required for the image combining processing, if image combining of image data for the basic color of the image processing unit with the other color image data than the basic color is likely to be required, as determined by the determining unit.

3. A computer readable medium storing an image forming program that causes a computer to perform a process executed in each of a plurality of image processing units each provided in association with one of printing units each provided for one of different basic printing colors, the process comprising:
    generating image data for a basic color of an image processing unit and image data for basic colors other than the basic color of the image processing unit required for combining processing of the image data for the basic color of the image processing unit, based on input printing data;
    image combining processing of the image data for the basic color of the image processing unit generated in the generating step; and
    transmitting the image data for the basic color of the image processing unit combined with other color image data after being processed in the image combining step to the corresponding one of the printing units.

* * * * *